__United States Patent__ [19]

Berge et al.

[11] 4,412,065

[45] Oct. 25, 1983

[54] POLY(OXY(SILYLENE) ESTERS)

[75] Inventors: Charles T. Berge; Mark P. Mack, both of Ponca City, Okla.

[73] Assignee: Conoco Inc., Ponca City, Okla.

[21] Appl. No.: 383,389

[22] Filed: Jun. 1, 1982

[51] Int. Cl.[3] ............................................. G08G 77/04
[52] U.S. Cl. ........................................ 528/26; 528/20; 528/21; 528/23
[58] Field of Search ............... 528/26, 20, 21, 23

[56] References Cited

U.S. PATENT DOCUMENTS 2,584,340  2/1952  Goodwin, Jr. et al. ............... 528/26
2,628,215  2/1953  Hunter et al. ........................ 528/43
3,126,403  3/1964  Matuszak et al. ............... 204/159.13

OTHER PUBLICATIONS

Barburina et al., Journal of General Chemistry of the USSR, 1976, vol. 46(8), pp. 1730–1733.

*Primary Examiner*—Melvyn I. Marquis
*Attorney, Agent, or Firm*—Cortlan R. Schupbach, Jr.

[57] ABSTRACT

The present invention describes novel hydrocarbon-insoluble poly-silyl esters and a method for forming these compounds utilizing carboxylic acid salts with silicon reagents in the presence of phase transfer catalysts.

14 Claims, No Drawings

POLY(OXY(SILYLENE) ESTERS)

This invention relates to a novel class of polyesters. More specifically, this invention relates to poly[oxy(silylene) esters] and a method for producing such compounds by carrying out a reaction of salts of dicarboxylic acids with silicon reagents in the presence of a phase transfer catalyst under mild conditions.

Representative but non-exhaustive examples of the art dealing with polyesters is U.S. Pat. No. 3,542,836, which describes acyloxyaroyloxsilanes and acyloxybenzoyloxysiloxanes having a structure described as

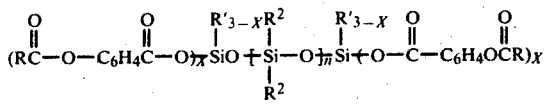

wherein R and R' are hydrogen, monovalent hydrocarbon radicals and halogenated monovalent hydrocarbon radicals, $R^2$ is a monovalent hydrocarbon radical or halogenated monovalent hydrocarbon radicals, X is from 1 to 3 and n is from 0 to 1000. These materials are endcapped and have repeating SiO units.

U.S. Pat. No. 2,628,215 shows the preparation of copolymers of a silane alcohol and carboxylic acid by reacting a polybasic acid with a silane alcohol reaction product which there are no hydroxyl group. This reference requires the use of strong acids such as hydrochloric or sulfuric acids as catalysts.

U.S. Pat. No. 4,282,336 teaches dialkyl phthlate compounds having at least one silyl group, and represented by the formula

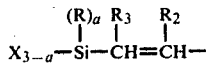

where R, $R_2$ and $R_3$ are hydrogen or monovalent hydrocarbon radicals, X is halogen, alkoxy, acryloxy, aminoxy, phenoxy, thioalkoxy or amino and a is 0, 1 or 2.

U.S. Pat. No. 3,346,610 shows the preparation of acyloxy endblocked organosiloxanes by reacting an acyloxysilane or acyloxysiloxane in the presence of a metal halide Friedel-Crafts catalyst with a cyclic diorganosiloxane.

U.S. Pat. No. 2,822,350 shows a preparation of linear polyesters at low temperature using strong bases or salts as catalysts. U.S. Pat. No. 3,594,350 shows polycarboxylic acid esterified using an alkylene glycol in the presence of ammonium salts of dibasic carboxylic acids or in the presence of ammonia.

U.S. Pat. No. 3,126,403 teaches lubricating oils prepared by reacting a synthetic lubricating oil with a silicon material of the formula $R_3SiX$ where X is halogen or a hydroxy and R is a halogen or hydrocarbon.

Ester oligomers containing silicon are described by Barburina and Lebeder in the *Journal of General Chemistry of the USSR,* 1976, Volume 46 (8), pages 1730 to 1733.

These materials are produced by reacting organocyclosilathianes with carboxylic acids and phenols. These materials are cyclic oligomers, (based on infrared analysis) with molecular weights of about 1350. This reference produced hydrocarbon-soluble oligomers. The authors stated that the weight of the produced oligomers was little dependent on the synthesis.

It would be of great benefit to provide a polyester which is substantially hydrocarbon insoluble for use in applications such as gas chromatography column packing, liquid chromatography column packing, catalyst supports for high temperature reactions, articles useful under conditions of high abrasion, blend additives in commercial products such as thermoplastics, cross-linking agents for synthetic and natural material such as silica gel, water repellant coatings, solid additives to reduce friction in flowing slurries or fluids, blending components to increase product combustibility such as in charcoal and insulating materials and semi-conductors or dopants for micro electronics.

We have now discovered polysilyl ester hydrocarbon-insoluble polymers of the general formula

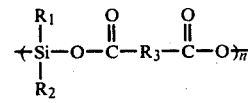

wherein $R_1$ and $R_2$ are, independently, hydrogen, halide, alkyl groups containing from 1 to 30 carbon atoms, cycloalkyl groups, alkaryl groups, aralkyl groups, aryl groups or bicycloalkyl groups, each containing from 6 to 30 carbon atoms, $R_3$ is an alkyl group containing from 1 to 30 carbon atoms, a cycloalkyl group, alkaryl group, aralkyl group, aryl group or bicycloalkyl group containing from 6 to 30 carbon atoms and n is greater than 10, and are substantially hydrocarbon insoluble.

The present invention thus describes a high molecular weight substantially hydrocarbon insoluble polymer which can be produced under mild conditions by either reacting a hydrocarbon insoluble carboxylic acid salt with a hydrocarbon soluble silicon reagent in the presence of a phase transfer catalyst, or by reacting a hydrocarbon soluble carboxylic acid derivative such as an acid halide with a hydrocarbon insoluble silanoic salt in the presence of a phase transfer catalyst. The basic chemical reaction scheme is

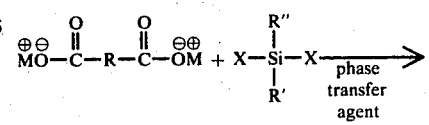

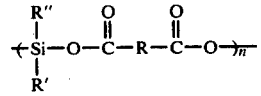

wherein M, R and n are as defined hereinafter.

More specifically, substantially hydrocarbon insoluble polysilyl esters of the general formula

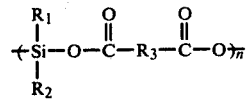

are formed by reacting a hydrocarbon soluble silicon dihalide, silicon trihalide, silicon tetrahalide, or mixtures of these with a hydrocarbon insoluble dicarboxylic acid salt in the presence of a phase transfer catalyst, wherein $R_1$ and $R_2$ are, independently, hydrogen, halide, alkyl groups containing from 1 to 30 carbon atoms, cycloalkyl groups, alkaryl groups, aralkyl groups, aryl groups or bicycloalkyl groups, each containing from 6 to 30 carbon atoms, R₃ is an alkyl group containing from 1 to 30 carbon atoms, a cycloalkyl group, alkaryl group, aralkyl group, aryl group or bicycloalkyl group containing from 6 to 30 carbon atoms, and n is greater than 10.

Those skilled in this art will recognize that the insoluble polysilyl esters of the present invention necessarily contain end groups. The end groups can be varied depending on the particular reactants utilized. Representative but non-exhaustive examples of the insoluble polysilyl esters of the present invention are

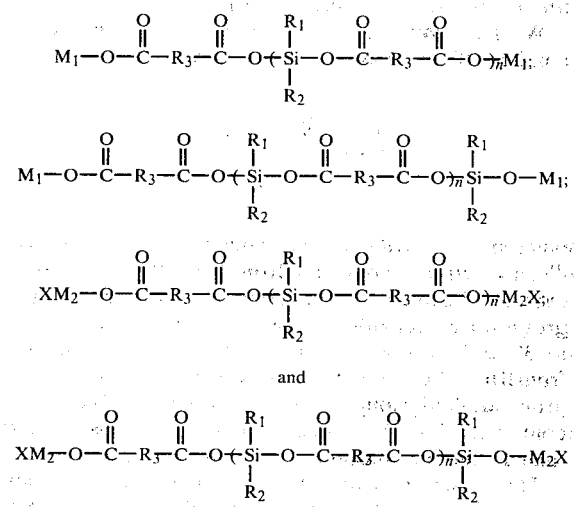

wherein M₁, M₂, R₁, R₂, R₃, X and n are as hereinafter defined.

In this specification and claims, the term "substantially hydrocarbon insoluble" means that no more than 1% by weight of the polymer will dissolve in benzene at 85° C. This insolubility is believed due to the higher molecular weight of the polymers of the present invention in contrast to the hydrocarbon soluble oligomers of the prior art, represented by Barburina et al.

The reaction can be carried out at temperatures ranging from about 0° C. to about 200° C., while from about 10° C. to about 150° C. is preferred. Although the reaction will proceed at temperatures higher and lower than these, the stated reaction range is merely the most convenient and provides the best reaction conditions.

Pressure or lack of pressure is not critical to the process of the present invention, other than that the reactants be kept either in a liquid or a solid form for best reaction. Thus, under normal conditions, pressures of from about atmospheric to about 10 atmospheres will be used.

In carrying out the process of the present invention, the hydrocarbon soluble silicon halide is a material having the general formula

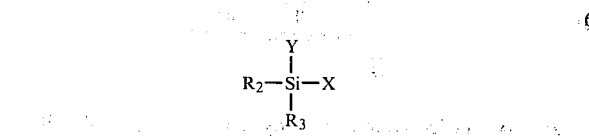

wherein R₂ and R₃ are, independently, hydrogen, halide, alkyl groups containing from 1 to 30 carbon atoms, O—SiR₃; —OR, —NR₂, cycloalkyl groups, aralkyl groups, alkaryl groups, aryl groups, bicycloalkyl groups, each containing from 6 to 30 carbon atoms, and wherein X and Y are F, Cl, Br or I. Thus it is possible for the silicon halide to have more than two halogens attached to silicon atom, but only the least electronegative halogens will be reacted to carry out the process of the present invention.

Representative but non-exhaustive examples of silicon halides useful in the present invention are:
(CH₃)₂SiCl₂
(C₂H₅)HSiCl₂
(i—C₃H₇)(C₂₀H₄₁)SiBr₂
(n—C₄H₉)(C₆H₅)SiBrCl
(CH₃C₆H₄)(cyclo—C₆H₁₁)SiI₂
(C₆H₅C₂H₄)(t—C₄H₉)SiICl
(CH₃C₆H₄)(CH₃O—)SiCl₂
(C₁₂H₂₅)SiBr₂F
([C₂H₅]₂N—)₂SiBrCl
(C₄H₉O—)([i—C₃H₇]₂N)SiCl₂
(bicyclo[2.2.2]octa-1-ane)(C₂H₅)SiBrCl
(C₆H₅)([n—C₃H₂]₃SiO—)SiBrCl
(C₆H₅O—)₂SiCl₂
(CH₃C₆H₄O—)([C₆H₅]₃SiO—)SiBr₂
(C₃H₇C₆H₄)([CH₃]₂FSiO—)SiCl₂
([C₆H₅]₃SiO—)FSiCl₂
(C₁₀H₂₁)SiCl₃
(i—C₄H₉)SiBrCl₂
SiBr₂Cl₂
SiBrICl₂
SiFClBrI
(n—C₄—H₉]₃SiO—)SiCl₃
([C₂H₅]₂N—)SiBrCl₂
(CH₃C₆H₄O—)SiBr₃.

When the reaction is carried out by reacting a hydrocarbon insoluble disilanoic salt, a trisilanoic salt, or a tetrasilanoic salt with a hydrocarbon soluble dicarboxylic acid halide or a polycarboxylic acid, the silicon silanoates have a formula selected from the group consisting of

wherein M₂ is selected from the group consisting of lithium, sodium, potassium, rubidium, and cesium, and

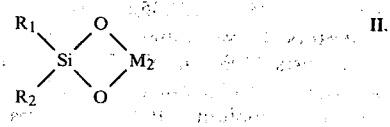

where M₂ is selected from the group consisting of magnesium, calcium, barium and zinc, and wherein R₁ and R₂ are, independently, hydrogen, halide, alkyl groups containing from 1 to 30 carbon atoms, cycloalkyl groups, alkaryl groups, aryl groups or bicycloalkyl groups each containing from 6 to 30 carbon atoms.

Representative but non-exhaustive examples of Group I silanates useful in the present invention are
(CH₃)₂Si(ONa)₂
(C₃H₇)₂Si(OK)₂
(C₆H₅)₂Si(OLi)₂

(i—C$_4$H$_9$)$_2$Si(OCs)$_2$
(n—C$_4$H$_9$)$_2$Si(OK)$_2$
(CH$_3$C$_6$H$_4$)$_2$Si(ONa)$_2$
(C$_6$H$_5$CH$_2$)$_2$Si(ORb)$_2$
(i—C$_3$H$_7$)Si(ONa)$_3$
(CH$_3$)Si(OLi)$_3$
(C$_{30}$H$_{61}$)Si—OC$_s$)$_3$
Si(ONa)$_4$
Si(OLi)$_4$
(cyclo-C$_6$H$_{11}$)Si—OK)$_3$
Si(OK)$_4$
Si(ONa)$_2$(OK)$_2$.

Representative but non-exhaustive examples of Group II silanates useful in the present invention are

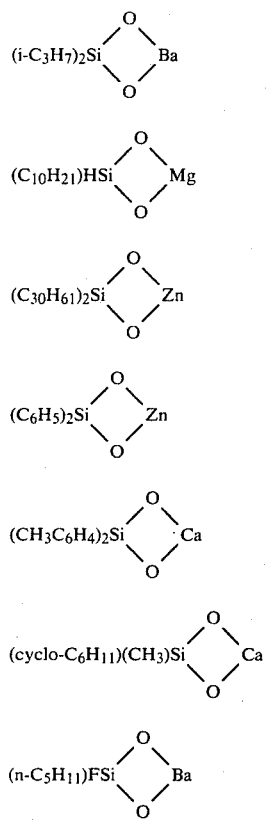

Hydrocarbon soluble dicarboxylic acid halides useful in the present invention have the general formula

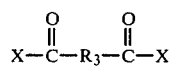

wherein R$_3$ is an alkyl group containing from 1 to 30 carbon atoms, a cycloalkyl group, alkaryl group, aralkyl group, aryl group or bicycloalkyl group containing from 6 to 30 carbon atoms and X is a halogen.

Representative but non-exhaustive examples of hydrocarbon soluble dicarboxylic acid halides useful in the practice of the present invention are 1,4-benzene dicarboxylic acid dichloride, glutaryl chloride, isophthaloyl chloride, malonyl dichloride, o-phthaloyl chloride, halides having the structures

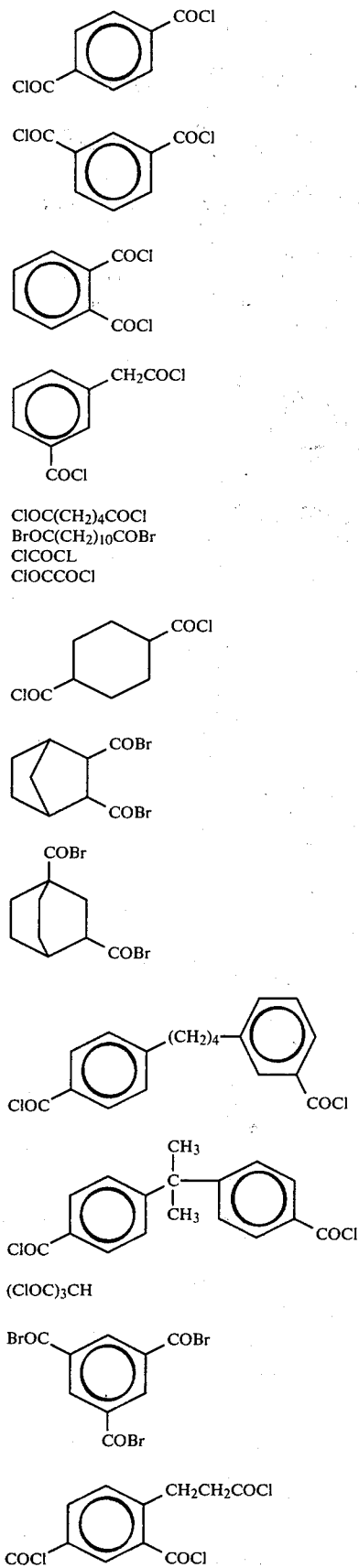

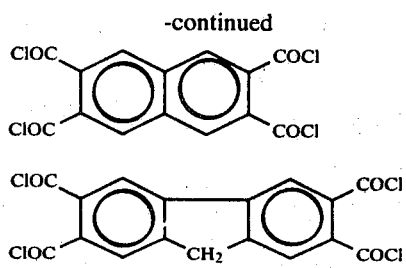

and mixtures of these.

Representative but non-exhaustive examples of hydrocarbon insoluble carboxylic acid salts useful in the present invention are

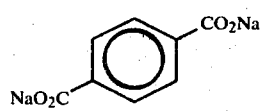

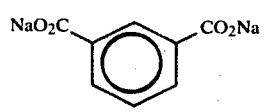

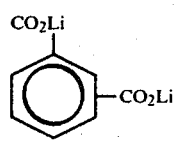

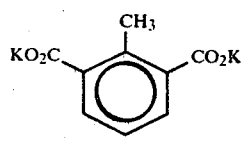

$KO_2CCH_2CO_2K$
$KO_2C(CH_2)_4CO_2K$
$NaO_2CCO_2Na$

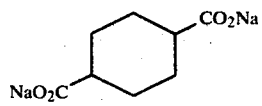

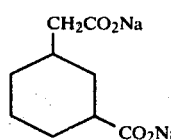

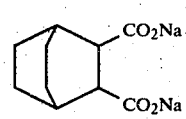

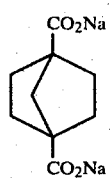

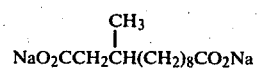

$$\underset{\text{CH}_3}{\text{NaO}_2\text{CCH}_2\overset{|}{\text{CH}}(\text{CH}_2)_8\text{CO}_2\text{Na}}$$

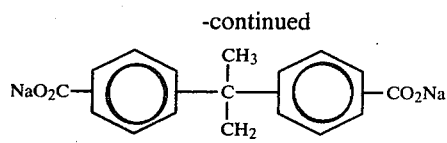

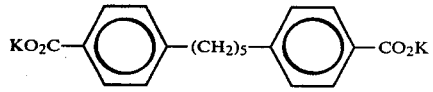

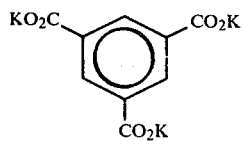

$(NaO_2CCH_2)_3CH$

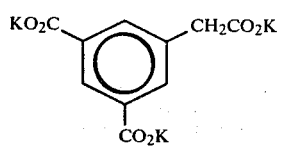

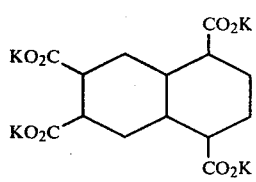

In either case, the reaction is carried out in the presence of a phase transfer catalyst which can be a quaternary ammonium salt, a crown ether, or a cryptate. Representative but non-exhaustive examples of quaternary ammonium salts useful in the practice of the present invention are hexadecyltrihexylammonium bromide; triocylethylammonium bromide; tridecylmethylammonium chloride, diodecyldimethylammonium chloride, tetraheptylammonium iodide; dioctadecyldimethyl ammonium chloride; tridecylbenzylammonium chloride; ditricosylmethylammonium chloride; tricaprylyldodecylammonium p-toluene sulfonate; tetranonylammonium hydroxide, N,N,N,N-tetramethyl-N,N-ditetradecyl-p-xylene-α,α'-diammonia dichloride; N,N,N,N'-tetramethyl-N,N'-dioctadecyl-x-dodecyl-y-xylene α,α'-diammonium dichloride; N,N-dioctadecyl-N-methyl-N,N'-dioctadecyl-p-xylene α,α'-diammonium dichloride; N,N,N'N-tetramethyl-N,N'dioctadecyl-1,2-ethyl'diammonium dibromide; N,N'-dimethyl-N,N,N'N-tetraheptdecyl-2-butene-1,4-diammonium chloride or mixtures of these.

Representative but non-exhaustive examples of crown ethers and cryptates which are suitable reactants in the process of the present invention are 15-crown-5; 18-crown-6; dibenzo-18-crown-6; dicyclohexyl-18-crown-6; benzo-15-crown-5; alkyl-18-crown-6; alkyl-2,2,2-cryptate; benzo-2,2,2-cryptate; 2,2,2-cryptate; 2,2,1-cryptate; 2,1,1-cryptate; dibenzo-24-crown-6; 12-crown-4 and mixtures of these.

The invention is more concretely described with reference to the examples below wherein all parts and percentages are by weight unless otherwise specified. Examples are provided to illustrate the present invention and not to limit it.

EXAMPLE 1

A 100 milliliter (ml) round bottom flask was charged with disodium salt of terephthalic acid (3.00 grams, 0.0215 moles), 50 ml of dry hexane, and 18-crown-6 (0.03 grams). The reaction mixture was completed by the addition of 4.12 grams methylphenyldichlorosilane, (22 mmoles). The reaction was allowed to stir for 3 hours at ambient temperature 22° C., forming a white slurry. The white slurry was filtered and the solid recovered. The recovered solid was thoroughly washed with water. The dry solid was highly crystalline and had a decomposition point above 350° C. Analysis showed the compound contained silicon.

The reaction sequence of Example 1 is believed to be as set forth below:

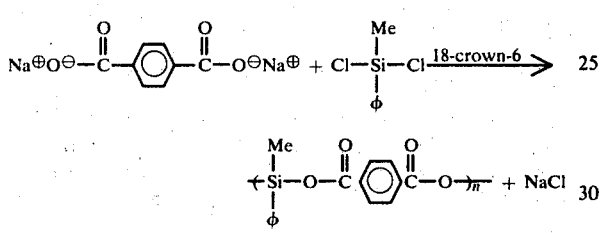

wherein n is greater than 10. The product is insoluble in boiling benzene (85° C.).

EXAMPLE 2

A 100 milliliter (ml) round bottom flask is charged with terephthaloyl chloride (5.00 grams, 0.0246 moles), 50 ml of dry hexane and 18-crown-6 (0.02 grams). To this mixture is added the disodium salt of dimethylsilanediol at 22° C. The reaction is stirred for 5 hours and then filtered. The white powder that is isolated is washed with cold hexane (3×50 ml) and then with water (3×100 ml). Thorough drying a white, highly crystalline material is obtained.

While not firmly established, and we do not wish to be bound thereby, the reaction is believed to proceed as follows:

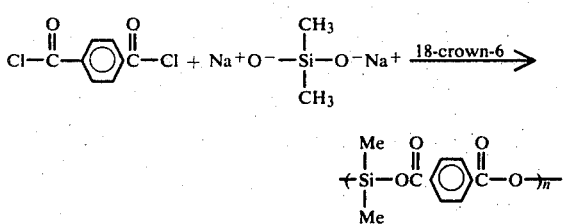

where n is greater than 10. The product is insoluble in boiling benzene.

While certain embodiments and details have been shown for the purpose of illustrating this invention, it will be apparent to those skilled in this art that various changes and modifications may be made herein without departing from the spirit or scope of the invention.

We claim:

1. Polysilyl esters of the general formula

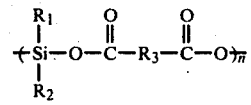

wherein $R_1$ and $R_2$ are, independently, hydrogen, halide, alkyl groups containing from 1 to 30 carbon atoms, cycloalkyl groups, alkaryl groups, aralkyl groups, aryl groups or bicycloalkyl groups, each containing from 6 to 30 carbon atoms, $R_3$ is an alkyl group containing from 1 to 30 carbon atoms, a cycloalkyl group, alkaryl group, aralkyl group, aryl group or bicycloalkyl group containing from 6 to 30 carbon atoms and n is greater than 10.

2. Polysilyl esters as described in claim 1 wherein $R_1$, $R_2$ and $R_3$ are methyl groups, ethyl groups or phenyl groups.

3. Hydrocarbon insoluble polysilyl esters having the general formula selected from the group consisting of

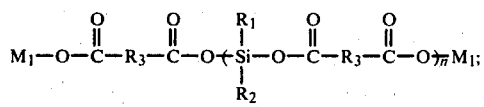

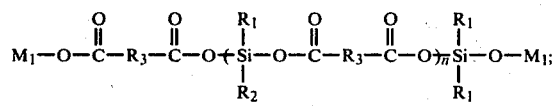

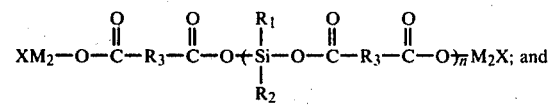

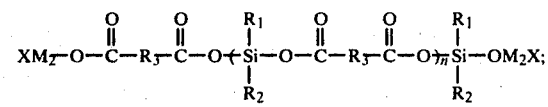

wherein $R_1$, $R_2$ and $R_3$ are, independently, alkyl groups containing from 1 to 30 carbonatoms, cycloalkyl groups, alkaryl groups, aralkyl groups, aryl groups or bicycloalkyl groups, each containing from 6 to 30 carbon atoms, M is a metal selected from the group consisting of lithium, sodium, potassium, rubidium and cesium, $M_2$ is a metal selected from the group consisting of magnesium, calcium, barium and zinc, X is halogen and n is greater than 10, and $R_1$ and $R_2$ are, in addition, hydrogen and halide.

4. A method for the preparation of polysilyl esters having the general formula

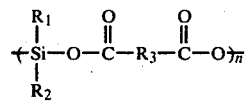

wherein $R_1$ and $R_2$ are, independently, hydrogen, halide, alkyl groups containing from 1 to 30 carbon atoms, cycloalkyl groups, alkaryl groups, aryalkyl groups, aryl groups or bicycloalkyl groups, each containing from 6 to 30 carbonatoms, $R_3$ is an alkyl group containing from 1 to 30 carbon atoms, a cycloalkyl group, alkaryl group, aralkyl group, aryl group or bicycloalkyl group containing from 6 to 30 carbon atoms and n is greater than 10 comprising reacting a silicon dihalide, silicon trihalide, silicon tetrahalide, or mixtures of these with a dicarboxylic acid salt or polycarboxylic acid salt in the presence of a phase transfer catalyst.

5. A method as described in claim 4 wherein the reaction is carried out at a temperature of from about 10° C. to about 150° C.

6. A method as described in claim 5 wherein the silicon halide is a material having the general formula $R_2 R_3 Y SiX$, wherein $R_2$ and $R_3$ are, independently, hydrogen, alkyl groups containing from 1 to 30 carbon atoms, O—SiR$_3$, —OR, —NR$_2$, cycloalkyl groups, aralkyl groups, alkaryl groups, aryl groups, bicycloalkyl groups, each containing from 6 to 30 carbon atoms, and wherein X and Y are F, Cl, Br or I.

7. A method as described in claim 6 wherein the reaction is carried out in an aprotic solvent.

8. A method as described in claim 7 wherein the solvent is selected from the group consisting of hydrocarbon solvents, aromatic solvents, and mixtures of these.

9. A method as described in claim 7 wherein the phase transfer catalyst is a quaternary ammonium salt selected from the group consisting of hexadecyltrihexylammonium bromide; trioctylethylammonium bromide; tridecylmethylammonium chloride; didodecyldimethylammonium chloride; tetraheptylammonium iodide; dioctadecyldimethyl ammonium chloride; tridecylbenzylammonium chloride; ditricosylmethylammonium chloride; tricaprylyldodecylammonium p-toluene sulfonate; tetranonylammonium hydroxide; N,N,N,N-tetramethyl-N,N-ditetradecyl-p-xylene-α,α'-diammonia dichloride; N,N,N'N'-tetramethyl-N,N'-dioctadecyl-x-dodecyl-y-xyleneα,α'diammonium dichloride; N,N-dioctadecyl-N-methyl-N,N'-dioctadecyl-p-xyleneα,α'-diammonium dichloride; N,N,N',N-tetramethyl-N,N'dioctadecyl-1; 2-ethyl'diammonium dibromide; N,N'-dimethyl-N,N,N'N'-tetraheptadecyl-2-butene-1; 4-diammonium chloride and mixtures of these.

10. A method as described in claim 7 wherein the phase transfer catalyst is a crown ether selected from the group consisting of 15-crown-5; 18-crown-6; dibenzo-18-crown-6; dicyclohexyl-18-crown-6; benzo-15-crown-5; alkyl-18-crown-6; alkyl-2,2,2-cryptate; benzo-2,2,2-cryptate; 2,2,2-cryptate; 2,2,1-cryptate; 2,1,1-cryptate; dibenzo-24-crown-6; 12-crown-4 and mixtures of these.

11. A method for the preparation of silyl esters having the general formula

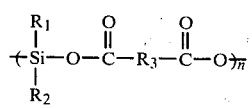

wherein $R_1$ and $R_2$ are, independently, hydrogen, halide, alkyl groups containing from 1 to 30 carbon atoms, cycloalkyl groups, alkaryl groups, aralkyl groups, aryl groups or bicycloalkyl groups, each containing from 6 to 30 carbon atoms, $R_3$ is an alkyl group containing from 1 to 30 carbon atoms, a cycloalkyl group, alkaryl group, aralkyl group, aryl group or bicycloalkyl group containing from 6 to 30 carbon atoms and n is greater than 10, comprising reacting a di-silanoate salt, a trisilanoate salt or a tetra-silanoate salt with a dicarboxylic acid halide or a polycarboxylic acid halide in the presence of a phase transfer catalyst.

12. A method as described in claim 11 wherein the silicon silanoate has a formula selected from the group consisting of

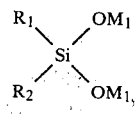

where $M_1$ is selected from the group consisting of lithium, sodium, potassium, rubidium and cesium, and

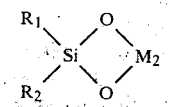

where $M_2$ is selected from the group consisting of magnesium, calcium, zinc, and barium and wherein $R_1$ and $R_2$ are, independently, hydrogen halide, alkyl groups containing from 1 to 30 carbon atoms, cycloalkyl groups, alkaryl groups, aralkyl groups, aryl groups or bicycloalkyl groups, each containing from 6 to 30 carbon atoms, $R_3$ is an alkyl group containing from 1 to 30 carbon atoms, a cycloalkyl group, alkaryl group, aralkyl group, aryl group or bicycloalkyl group containing from 6 to 30 carbon atoms and n is greater than 10.

13. A method as described in claim 11 wherein the dicarboxylic halides have the general formula

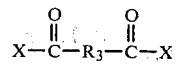

wherein an alkyl group containing from 1 to 30 carbon atoms, a cycloalkyl group, alkaryl group, aralkyl group, aryl group or bicycloalkyl group containing from 6 to 30 carbon atoms.

14. A method as described in claim 13 wherein the dicarboxylic acid halide is selected from the group consisting of 1,4-benzenedicarboxylic acid and dichloride, glutaryl chloride, isophthaloyl chloride, malonyl dichloride, o-phthalyl chloride halides having the structures

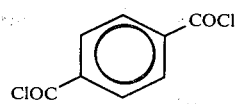

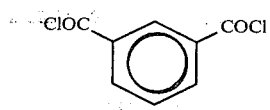

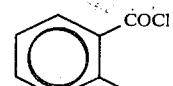

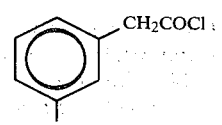

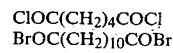

-continued
ClCOCL
ClOCCOCl
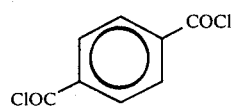
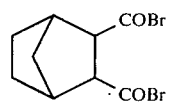
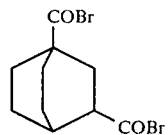
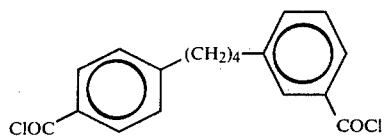
-continued
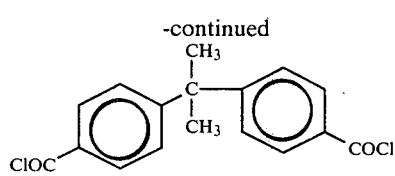
(ClOC)₃CH
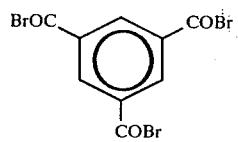
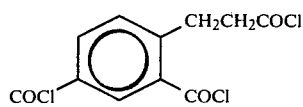
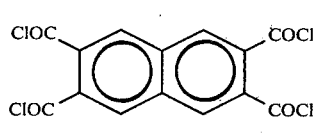
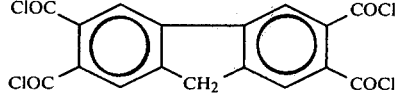
and mixtures of these.
* * * * *